(12) United States Patent
Jung

(10) Patent No.: US 7,050,519 B2
(45) Date of Patent: May 23, 2006

(54) DEVICE FOR DETECTING TIMING SYNCHRONIZATION, METHOD THEREOF, AND COMMUNICATION DEVICE USING THE SAME

(75) Inventor: Suk-jin Jung, Yongin (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 769 days.

(21) Appl. No.: 10/043,095

(22) Filed: Jan. 14, 2002

(65) Prior Publication Data

US 2002/0110207 A1   Aug. 15, 2002

(30) Foreign Application Priority Data

Feb. 9, 2001   (KR) .................... 2001-6517

(51) Int. Cl.
*H04L 7/00* (2006.01)

(52) U.S. Cl. .................. 375/354; 375/149; 375/152

(58) Field of Classification Search ............. 375/354, 375/149, 152
See application file for complete search history.

(56) References Cited

U.S. PATENT DOCUMENTS

| 4,020,424 A | * | 4/1977 | Burdick ............... 327/552 |
| 5,566,214 A | * | 10/1996 | Kroeger et al. ......... 375/355 |
| 6,314,129 B1 | * | 11/2001 | Sunwoo et al. ......... 375/149 |
| 6,775,341 B1 | * | 8/2004 | Wang et al. ........... 375/354 |

* cited by examiner

*Primary Examiner*—Stephen Chin
*Assistant Examiner*—Jaison Joseph
(74) *Attorney, Agent, or Firm*—Sughrue, Mion, PLLC (57) ABSTRACT

A device for detecting a timing synchronization, a method, and a communication device. The device includes a unit for outputting a timing synchronization discriminating signal, which corresponds to a difference between samples that are ahead and behind of the input signal by a semi-symbol period; a unit for semi-symbol delaying a real number element and an imaginary number element of the input signal, and subtracting the delayed signals from the real number element and the imaginary number element of the input signal; a first detector for detecting a power from the semi-symbol delayed signals of the input signal; a power detector for detecting a power from the real number element and the imaginary number element from the timing error detecting unit; and a subtracter for subtracting a value, which is obtained by multiplying the power detected by the second detector by a predetermined coefficient, from the power detected by the first detector.

10 Claims, 8 Drawing Sheets

DEVICE FOR DETECTING TIMING SYNCHRONIZATION, METHOD THEREOF, AND COMMUNICATION DEVICE USING THE SAME

BACKGROUND OF THE INVENTION

1. Field of the Invention

The present invention relates to a device for detecting a timing synchronization, and in particular to an improved device for detecting a timing synchronization which can precisely detect the timing synchronization in a simple structure, a method thereof, and a communication device using the same. The present application is based on Korean Patent Application No. 2001-6517, which is incorporated herein by reference.

2. Description of the Related Art

In general, in a digital communication device such as a digital modem, it is very important to synchronize digital data, namely a symbol in an exact timing. Accordingly, there have been suggested a variety of devices for detecting a timing synchronization.

Figure 1:
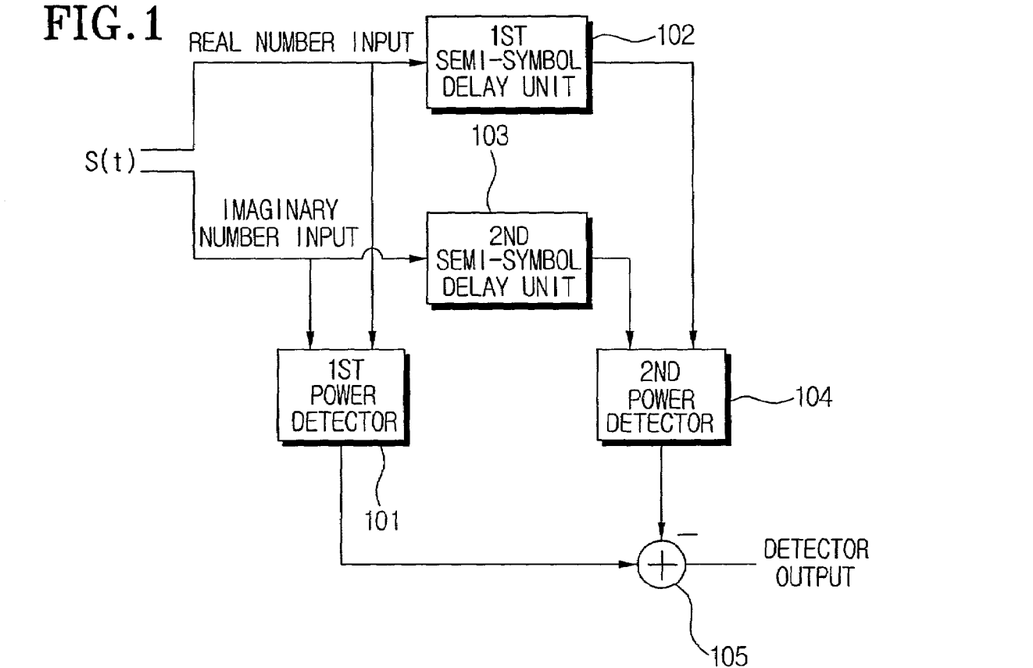
FIG. 1 is a block diagram illustrating a conventional device for detecting a timing synchronization.

FIG. 1 is a block diagram illustrating a conventional device for detecting a timing synchronization. As shown in FIG. 1, the device for detecting the timing synchronization includes a first power detector 101, a first semi-symbol delay unit 102, a second semi-symbol delay unit 103, a second power detector 104 and a subtracter 105.

The first power detector 101 receives a real number signal and an imaginary number signal of an input complex signal S(t), and detects a power level. The second power detector 104 receives a sample value delayed more than the input signal of the first power detector 104 by a semi-symbol period from the first semi-symbol delay unit 102 and the second semi-symbol delay unit 103, and detects a power level.

The subtracter 105 outputs a value obtained by subtracting the semi-symbol preceding power level from the second power detector 104 from the power level from the first power detector 101. Here, the output $Y_k$ from the subtracter 105 is represented by following formula 1:

<Formula 1>

$$Y_k = (X_k X_k^* - X_{k-1/2} X_{k-1/2}^*)$$

Here, $X_k$ represents an input signal and $X_{k-1/2}$ represents a semi-symbol period delayed signal.

The conventional device for detecting the timing synchronization outputs a greatest value at the precise sample point. Accordingly, whether the timing synchronization is performed can be discriminated according to an output level of the device for detecting the timing synchronization.

On the other hand, in order to restrict a data reception error, it is required to detect a symbol to be synchronized with a signal from a transmission side. For this, a communication device uses a timing error detector for detecting an error of a sampling timing of an input signal, and generating a signal proportional to the error, and a timing restoring circuit for restoring a timing according to the detected timing.

However, the conventional digital communication device respectively employs the device for detecting the timing synchronization and the device for detecting the timing error, and thus has a complicated structure.

Accordingly, researches have been made to embody the device for detecting the timing synchronization by using the constitutional units of the device for detecting the timing error.

SUMMARY OF THE INVENTION

Accordingly, it is a primary object of the present invention to provide a device for detecting a timing synchronization which can easily detect the timing synchronization from a general device for detecting a timing error.

It is another object of the present invention to provide a device for detecting a timing synchronization by using a new algorithm.

The above object is accomplished by a device for detecting a timing synchronization in a communication device in accordance with the present invention, including a plurality of differential filters having a differential property transfer function, for respectively filtering a real number element and an imaginary number element from an input signal; a first power detector for detecting a power level from the real number element and the imaginary number element of the input signal that are respectively received; a second power detector for detecting a power level from the real number element signal and the imaginary number element that are respectively received from the differential filter; and a subtracter for subtracting the power level detected by the second power detector from the power level detected by the first power detector, and outputting the resultant value.

Another object is accomplished by a device for detecting a timing synchronization in a communication device in accordance with the present invention, including a plurality of band-pass filters for respectively passing a real number element and an imaginary number element of an input signal through predetermined bands; a plurality of differential filters having a differential property transfer function, for respectively filtering the real number element and the imaginary number element of the input signal; a first power detector for detecting a power level from the real number element signal and the imaginary number element that are respectively received from the band-pass filter; a second power detector for detecting a power level from the real number element and the imaginary number element that are respectively received from the differential filter; and a subtracter for subtracting the power level detected in the second power detector from the power level detected in the first power detector, and outputting the resultant value.

Another object is also accomplished by a timing synchronization detecting apparatus in a communication device in accordance with the present invention, for outputting a timing synchronization discriminating signal, the timing synchronization discriminating signal being a difference between samples that are ahead and behind of the input signal by a predetermined symbol period.

Preferably, the timing synchronization detecting apparatus includes a timing error detecting unit for respectively semi-symbol delaying a real number element and an imaginary number element of the input signal, and subtracting the delayed signals from the real number element and the imaginary number element of the input signal; a first power detector for detecting a power level from the semi-symbol delayed signals of the input signal that are received; a second power detector for detecting a power level from the real number element and the imaginary number element that are received from the timing error detecting unit; and a subtracter for subtracting a value, which is obtained by multiplying the power level detected by the second power detector by a predetermined coefficient, from the power level detected by the first power detector.

Further, another object is also accomplished by a method for detecting a timing synchronization in a communication device in accordance with the present invention, including a first power detecting step for detecting a power level by respectively semi-symbol delaying a real number element and an imaginary number element of an input signal; a second power detecting step for detecting a power level by delaying the real number element and the imaginary number element of the input signal respectively by one time, and then by subtracting the delayed real number element and the imaginary number element from the real number element and the imaginary number element of the input signal; a coefficient multiplying step for multiplying the power level obtained in the second power detecting step by a predetermined coefficient; and a subtracting step for subtracting the multiplied value obtained in the coefficient multiplying step from the power level obtained in the first power detecting step.

Preferably, the coefficient is 0.5.

The above object is also accomplished by a communication device in accordance with the present invention, including a timing synchronization detecting unit for outputting a timing synchronization discriminating signal, the timing synchronization discriminating signal being a difference between samples that are ahead and behind of the input signal by a semi-symbol period, respectively; a detection timing deciding unit for deciding a detection timing of the input signal according to the timing synchronization discriminating signal from the timing synchronization detecting unit; and a data detecting unit for detecting the input signal according to the timing decided by the detection timing deciding unit.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

A device for detecting a timing synchronization in a communication device, a method thereof, and a communication device using the same in accordance with the present invention will now be described in detail with reference to the accompanying drawings.

Figure 2:
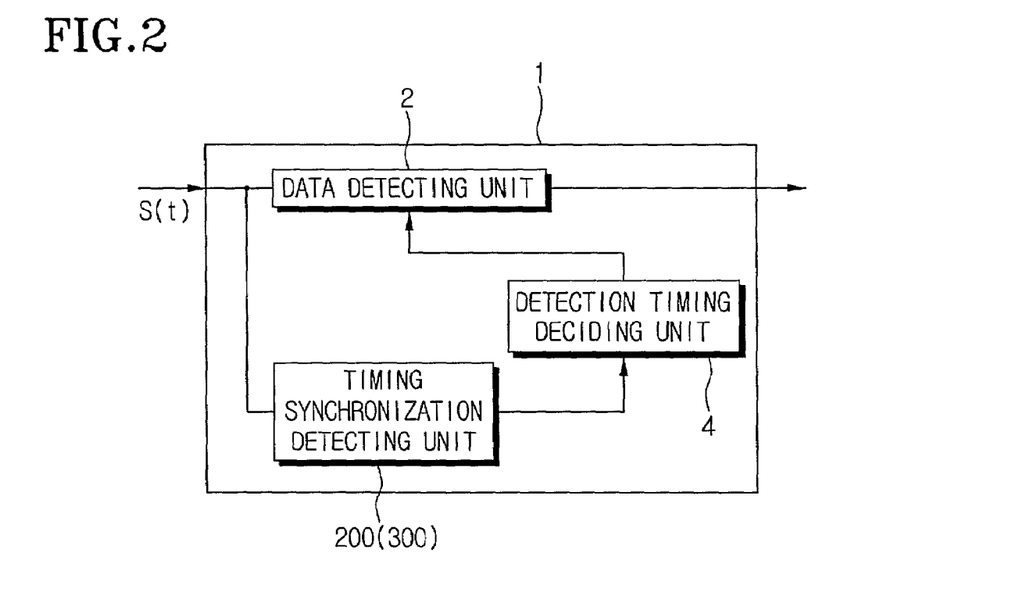
FIG. 2 is a block diagram illustrating a communication device in accordance with the present invention.

FIG. 2 is a block diagram illustrating the communication device in accordance with the present invention. As illustrated in FIG. 2, the communication device 1 includes a timing synchronization detecting unit 200 or 300, a data detecting unit 2 and a detection timing deciding unit 4.

The detection timing deciding unit 4 decides a detection timing of an input signal according to a timing synchronization discriminating signal from the timing synchronization detecting unit 200 or 300. The data detecting unit 2 detects the input signal in the timing decided by the detection timing deciding unit 4.

The timing synchronization detecting unit 200 or 300 will now be explained with reference to FIGS. 3 and 5.

Figure 3:
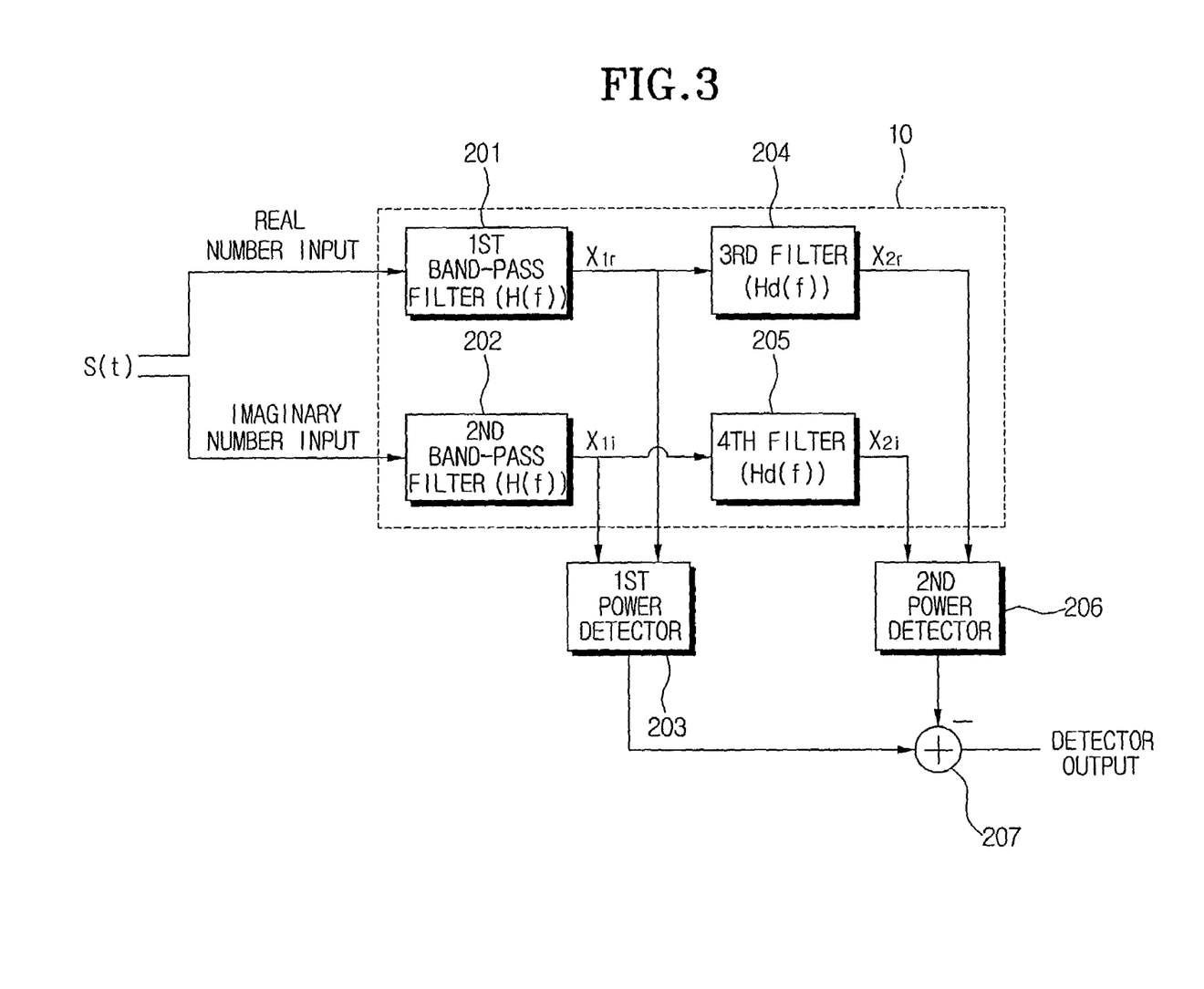
FIG. 3 is a block diagram illustrating a device for detecting a timing synchronization in accordance with a first embodiment of the present invention.

FIG. 3 is a block diagram illustrating the device for detecting the timing synchronization in accordance with a first embodiment of the present invention. As illustrated in FIG. 3, the device for detecting the timing synchronization 200 includes a device for detecting a frequency and timing error 10, a first power detector 203, a second power detector 206 and a subtracter 207.

The device for detecting the frequency and timing error 10 is described in detail in Korean Patent Application No. 1999-0042903 filed Oct. 5, 1999, entitled "Device for Detecting Frequency and Timing Error in Communication System", which is incorporated herein by reference. The device for detecting the frequency and timing error 10 includes a first band-pass filter 201, a second band-pass filter 202, a third filter 204 and a fourth filter 205. Here, the first and second band-pass filters 201 and 202 serve to decrease a pattern jitter of the device for detecting the frequency and timing error 10, and thus are not essentially required.

Figure 7:
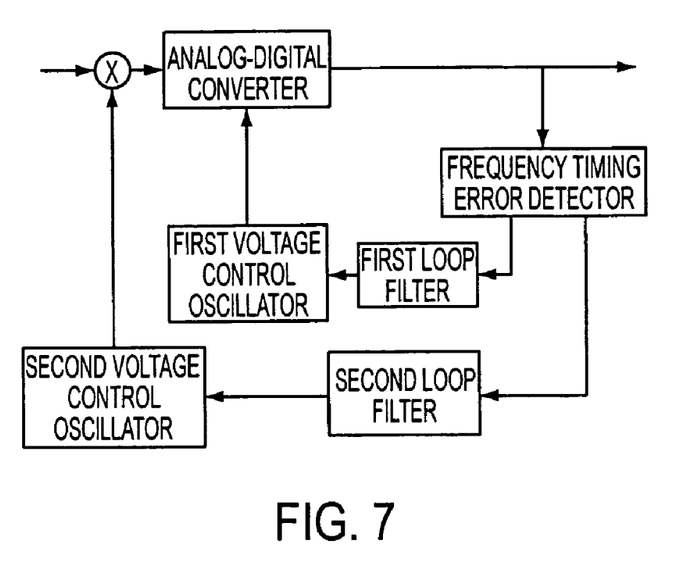
FIG. 7 is a block diagram of a circuit for detecting frequency and timing error and corresponds to FIG. 3 of KPA 1999-0042903.

FIG. 7 (FIG. 3 of KPA 1999-0042903) is a block diagram of a circuit for detecting frequency and timing error, which adopts an apparatus for detecting frequency and timing error in a communication system according to an embodiment of the present invention.

Figure 8:
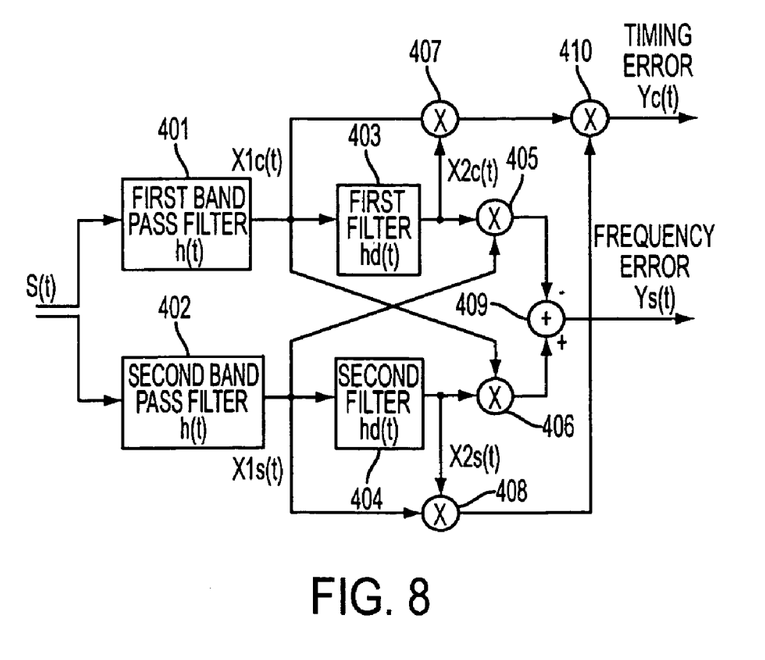
FIG. 8 represents an apparatus for detecting frequency and timing error and corresponds to FIG. 4 of KPA 1999-0042903.

As shown in FIG. 8 (FIG. 4 of KPA 1999-0042903), the apparatus for detecting the frequency and timing error in the communication system according to an embodiment of the present invention, includes first and second band pass filters 401 and 402, third and fourth filters 403 and 404, first, second, third, and fourth multipliers 405, 406, 407, and 408, and first and second adders 409 and 410.

The first and second band pass filters (h(t)) 401 and 402 have the center frequency of ½T (T is a symbol interval). The third and fourth filters ($h_d(t)$) 403 and 404 have differential characteristics in the analog implementation, or half symbol-period delay circuits or Hilbert filters in the digital implementation.

An input signal S(t) is a baseband complex signal. As for the input signal S(t), a real component is applied to the first band pass filter 401, and an imaginary component is applied to the second band pass filter 402.

The input signal S(t) can be expressed as Equation 1 (Equation 2 of KPA 1999-0042903).

$$s(t) = e^{j2\pi f_d^i t} \sum_i c_i g(t - iT)$$ [Equation 1]

$$= \sum_i c_i e^{j2\pi f_d^i iT} g(t - iT) e^{j2\pi f_d^i (t-iT)}$$

$$= \sum_i d_i g(t - iT) e^{j2\pi f_d^i (t-iT)}$$

wherein $d_i = c_i e^{j2\pi f_d^i iT}$.

The real and imaginary components of the input signal s(t) as shown in Equation 1, are separated and passed through the first and second band pass filters 501 and 502, respectively. A resultant output is given by Equation 2 (Equation 3 of KPA 1999-0042903).

$$x_1(t) = x_{1c}(t) + f x_{1s}(t)$$ [Equation 2]

$$= \sum_i d_i g(t - iT) e^{j2\pi f_d^i (t-iT)} * h(t)$$

$$= \sum_i d_i q_1(t - iT)$$

wherein $q_1(t) = g(t) e^{j2\pi f_d^i t} * h(t)$.

An output from the first and second filters 503 and 504 is given by Equation 4 (Equation 2 of KPA 1999-0042903).

$$x_2(t) = x_{2c}(t) + f x_{2s}(t)$$ [Equation 3]

$$= \sum_i d_i g(t - iT) e^{j2\pi f_d^i (t-iT)} * h(t) * h_d(t)$$

$$= \sum_i d_i q_2(t - iT)$$

wherein $q_2(t) = g(t) e^{j2\pi f_d^i t} * h(t) * h_d(t)$.

The multiplication value of the output of the first filter 403, which is the real component in Equation 3, and the output of the first band pass filter 401, which is the real component in Equation 2 is added at the second adder 410 to the multiplication value of the output of the second filter 404, which is the imaginary component in Equation 3, and the output of the second band pass filter 402, which is the imaginary component in Equation 2, to thus acquire $y_c(t)$. The multiplication value of the output of the second filter 404, which is the imaginary component in Equation 3, and the output of the first band pass filter 401, which is the real component in Equation 2, is added at the first adder 409 to the inverted multiplication value of the output of the first filter 403, which is the real component in Equation 3, and the output of the first band pass filter 402, which is the imaginary component in Equation 2, to thus acquire $y_s(t)$. $y_c(t)$ and $y_s(t)$ are given by Equation 4 (Equation 5 of KPA 1999-0042903).

$$y(t) = y_c(t) + f y_s(t)$$ [Equation 4]

$$= x_1(t) x_2^*(t)$$

$$= \sum_i d_i q_1(t - iT) \sum_l d_l^* q_2^*(t - lT)$$

$$= \sum_i \sum_l d_i d_l^* (t - iT) q_2^*(t - lT)$$

In Equation 4, an average of outputs for detecting the frequency-timing error is given by Equation 5 (Equation 6 of KPA 1999-0042903).

$$E[y(t)] = E\left[\sum_i \sum_l d_i d_l^* (t - iT) q_2^*(t - lT)\right]$$ [Equation 5]

$$= \sum_i E[d_i d_l^*] q_1(t - iT) q_2^*(t - lT)$$

$$= C_1 \sum_i q_1(t - iT) q_2^*(t - lT)$$

where $C_1 = E[d_i d_i^*]$.

The separation into the imaginary component and the real component based on Equation 5 can be given by Equation 6 (Equation 7 of KPA 1999-0042903) and Equation 7 (Equation 8 of KPA 1999-0042903).

$$\mathrm{Im} E[y(t)] = \frac{C_1}{T}\left[\int_{-\infty}^{\infty} |G(f - f_d)|^2 |H(f)|^2 \mathrm{Im}[H_d^*(f)] df + \right.$$ [Equation 6]

$$2\int_{-\infty}^{\infty} \mathrm{Im}\left[G\left(f - f_d + \frac{1}{2T}\right) G^*\left(f - \right.\right.$$

$$\left. f_d - \frac{1}{2T}\right) H\left(f + \frac{1}{2T}\right) H^*\left(f - \right.$$

$$\left.\left.\frac{1}{2T}\right) e^{\frac{j2\pi t}{T}} \right] \mathrm{Re}\left[H_d^*\left(f - \frac{1}{2T}\right)\right] df \right]$$

$$\mathrm{Re} E[y(t)] = \frac{C_1}{T}\left[\int_{-\infty}^{\infty} |G(f - f_d)|^2 |H(f)|^2 \mathrm{Re}[H_d^*(f)] df - \right.$$ [Equation 7]

$$2\int_{-\infty}^{\infty} \mathrm{Im}\left[G\left(f - f_d + \frac{1}{2T}\right) G^*\left(f - \right.\right.$$

$$\left. f_d - \frac{1}{2T}\right) H\left(f + \frac{1}{2T}\right) H^*\left(f - \right.$$

$$\left.\left.\frac{1}{2T}\right) e^{\frac{j2\pi t}{T}} \right] \mathrm{Im}\left[H_d^*\left(f - \frac{1}{2T}\right)\right] df \right]$$

Here, the imaginary component in Equation 6 corresponds to the frequency error detection output, and the real component in Equation 7 corresponds to the timing error detection output.

Figure 10:
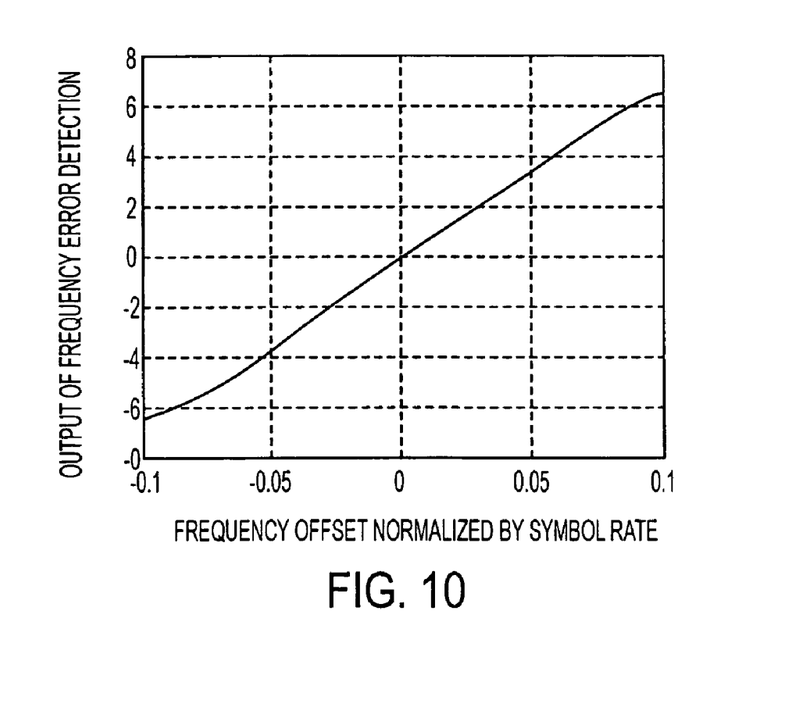
FIG. 10 is a graph showing frequency error detection output based on Equation 6 and corresponds to FIG. 6 of KPA 1999-0042903.
Figure 11:
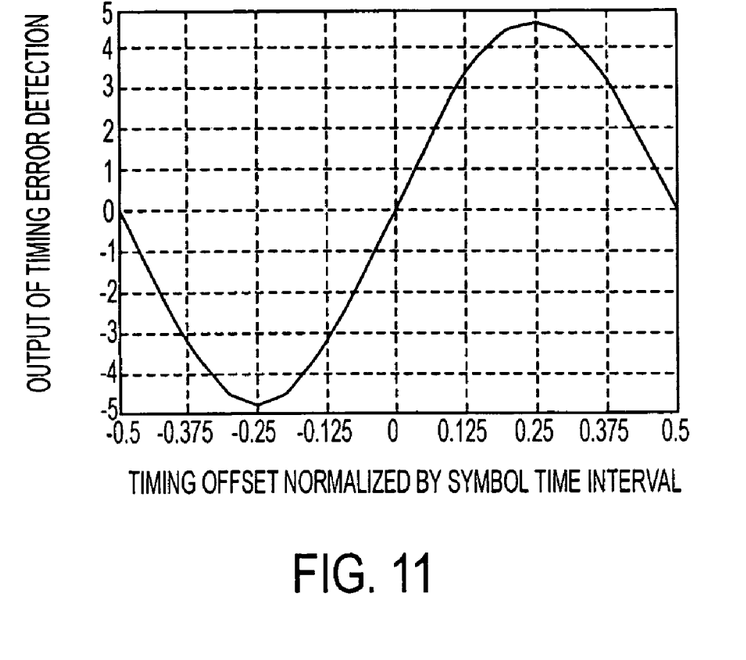
FIG. 11 is a graph showing frequency error detection output based on Equation 7 and corresponds to FIG. 7 of KPA 1999-0042903.

In FIG. 8 (FIG. 4 of KPA 1999-0042903), in case that it is designed that the first and second band pass filters (h(t)) 401 and 402 are fourth-order IIR filters and the first and second filters ($h_d(t)$) 403 and 404 are Hilbert filters, a S-curve of the frequency error detection output based on Equation 6 is shown in FIG. 6 and a S-curve of the timing error detection output based on Equation 7 is shown in FIG. 11 (FIG. 7 of KPA 1999-0042903).

Figure 9:
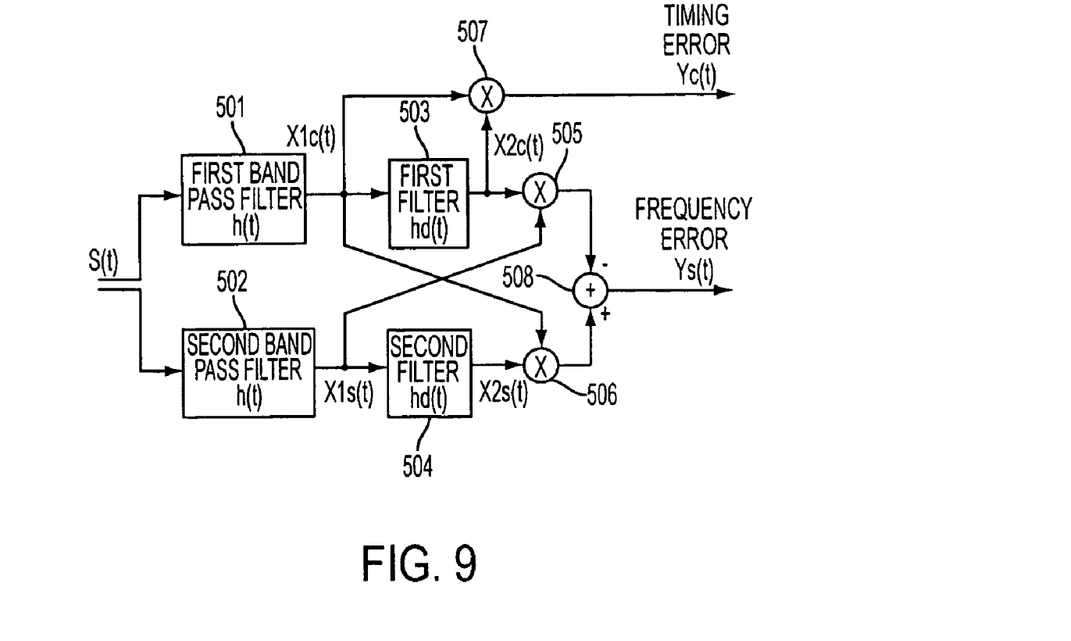
FIG. 9 represents another apparatus for detecting frequency and timing error and corresponds to FIG. 5 of KPA 1999-0042903.

It has been illustrated based on the construction of FIG. 8 (FIG. 4 of KPA 1999-0042903) by way of example. Note that a S-curve similar to FIGS. 10 and 11 (FIGS. 6 and 7 of KPA 1999-0042903) can be produced by interpreting another exemplary construction of FIG. 9 (FIG. 5 of KPA 1999-0042903) according to the above-mentioned procedure.

The interpretation of the frequency error detection output and the timing error detection output according to the circuitry of the present invention, produces the S-curves as shown in FIG. 10 and FIG. 11 (FIG. 6 and FIG. 7 of KPA 1999-0042903). It can be seen that the apparatus for detecting the frequency and timing error properly operates.

As set forth above, the circuitry complexity can be reduced by implementing the apparatus for detecting frequency error and the apparatus for detecting the timing error within one circuit.

As the third and fourth filters 204 and 205, differential property filters are used in an analog type, and semi-symbol period delay circuits or Hilbert filters are used in a digital type.

S(t) implies a baseband complex signal. A real number element of the input signal S(t) is applied to the first band-pass filter 201, and an imaginary number element thereof is applied to the second band-pass filter 202. Here, the output signals from the first and second band-pass filters 201 and 202 are X1$r$ and X1$i$, and the complex signal is represented by 'X1=X1$r$+jX1$i$'.

The first power detector 203 receives the real number signal X1$r$ from the first band-pass filter 201 and the imaginary number signal X1$i$ from the second band-pass filter 202, and detects a power level. In addition, the real number signal X1$r$ and the imaginary number signal X1$i$ from the first and second band-pass filters 201 and 202 pass through the third and fourth filters 204 and 205, and are outputted as a real number signal X2$r$ and an imaginary number signal X2$i$, respectively. The complex signal is represented by 'X2=X2$r$+jX2$i$'.

The second power detector 206 receives the real number signal X2$r$ from the third filter 204 and the imaginary number signal X2$i$ from the fourth filter 205, and detects a power level. The subtracter 207 subtracts the power level detected in the second power detector 206 from the power level detected in the first power detector 203.

The signal Y from the adder 207 is represented by following formula 2:

<Formula 2>

$$Y = X_1 X_1^* - X_2 X_2^*$$

Accordingly, the timing synchronization can be detected from a value obtained by subtracting the power level of the semi-symbol preceding signal X2 from the power level of the input signal X1.

As a result, the device for detecting the timing synchronization in accordance with the first embodiment of the present invention can be embodied by using the general device for detecting the timing error.

Figure 4:
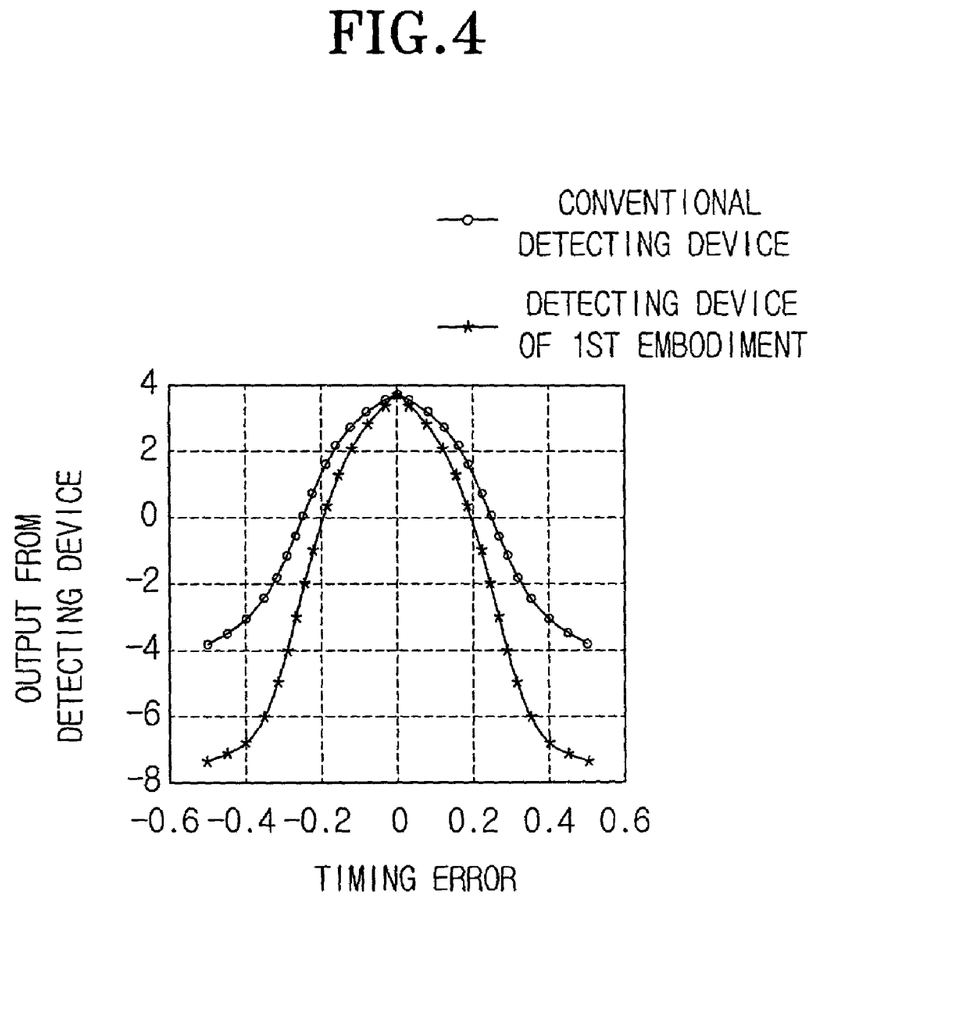
FIG. 4 is a graph showing output properties of the device in FIG. 3 and the device in FIG. 1 according to a timing error.

FIG. 4 is a graph showing output properties of the device in FIG. 3 and the device in FIG. 1 according to the timing error. As shown in FIG. 4, 64 quadrature amplitude modulation is used as a modulation method, and a roll-off factor is 0.18. A difference between an optimal point where the timing error is zero and a point where the timing error is not zero is greater in the device in FIG. 3 than the conventional device. Therefore, the device of the present invention can more easily detect and discriminate the synchronization than the conventional device.

Figure 5:
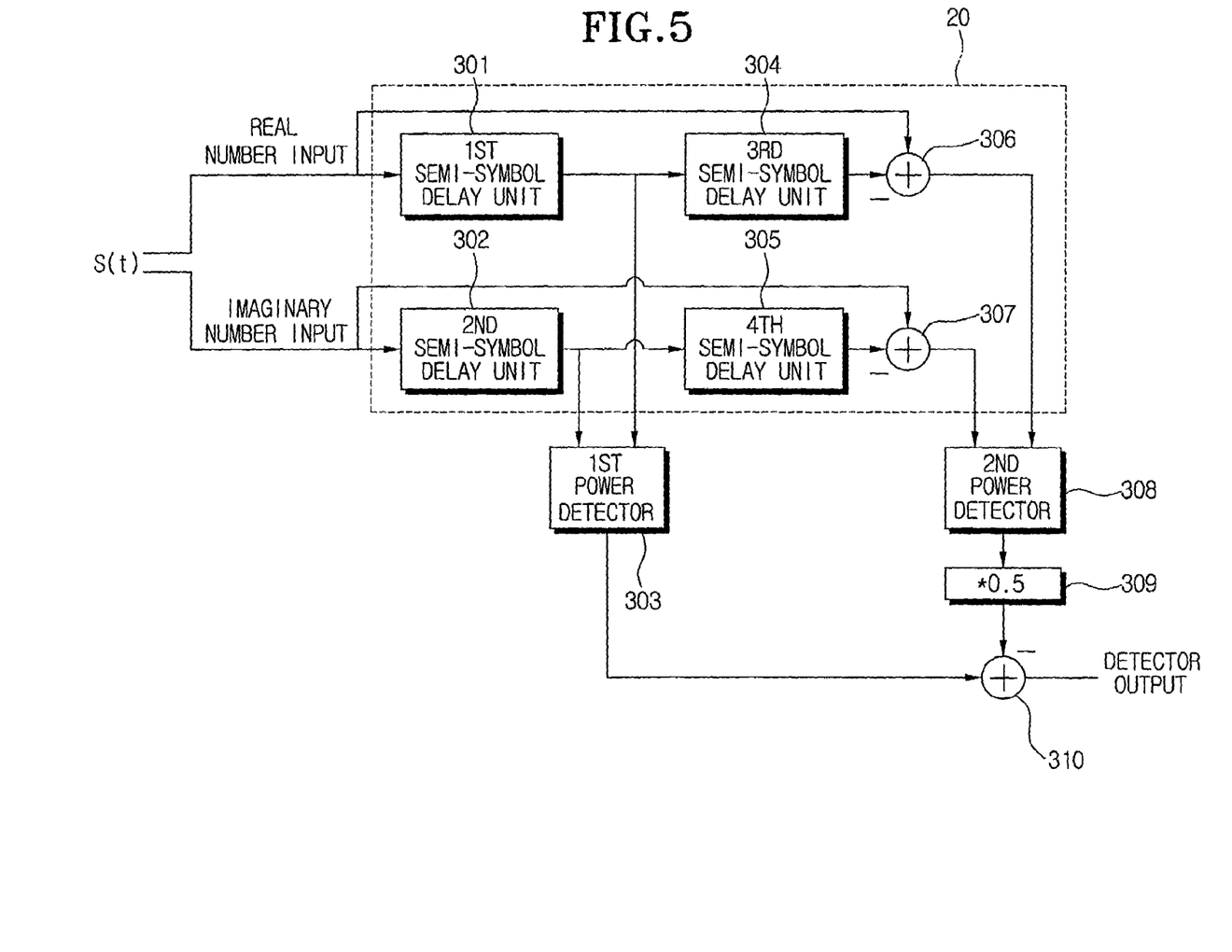
FIG. 5 is a block diagram illustrating a device for detecting a timing synchronization in accordance with a second embodiment of the present invention.

FIG. 5 is a block diagram illustrating the device for detecting the timing synchronization in accordance with a second embodiment of the present invention. As shown in FIG. 5, the device for detecting the timing synchronization 300 includes a Gardner timing error detecting device 20, a first power detector 303, a second power detector 308, a coefficient multiplier 309 and a subtracter 310.

An example of the Gardner timing error detecting device 20 is disclosed in "Lock Detection for Timing Recovery" by G. Karam, V. Paxal and M. Noeneclaey (IEEE international conference on communications vol 3. June 1996). In addition, the Gardner timing error detecting device 20 includes a first semi-symbol delay unit 301, a second semi-symbol delay unit 302, a third semi-symbol delay unit 304, a fourth semi-symbol delay unit 305, a first subtracter 306 and a second subtracter 307. The Gardner timing error detecting device 20 is a general synchronization detecting device.

The first power detector 303 detects a power level from a received real number element signal and an imaginary number element signal of an input signal, which are semi-symbol delayed respectively in the first and second semi-symbol delay units 301, 302.

The second power detector 308 receives a real number signal obtained by subtracting one symbol-delayed signal generated by the first and third semi-symbol delay units 301, 304 from the real number element of the input signal, and an imaginary number signal obtained by subtracting one symbol-delayed signal generated by the second and fourth semi-symbol delay units 302, 305 from the imaginary number element of the input signal, and detects a power level. The power level from the second power detector 308 is multiplied by a coefficient(0.5) in the coefficient multiplier 309. Here, a shifter may be used as the coefficient multiplier 309.

The subtracter 310 subtracts the power level outputted from the coefficient multiplier 309 from the power level detected in the first power detector 303. Then, the subtracter 310 outputs a signal Y$_k$ represented by following formula 3:

<Formula 3>

$$Y_k = X_k X_k^* - (X_{k+1/2} - X_{k-1/2})(X_{k+1/2} - X_{k-1/2})^*$$

In formula 3, X$_k$ is an input signal, X$_{k+1/2}$ is a semi-symbol period preceding signal, and X$_{k-1/2}$ is a semi-symbol period delayed signal.

Accordingly, the output signal from the device in FIG. 5 becomes a value obtained by subtracting a power level of a difference between the semi-symbol period preceding sample and the semi-symbol period succeeding sample from the power level of the optimal sample point, thereby detecting the timing synchronization.

Figure 6:
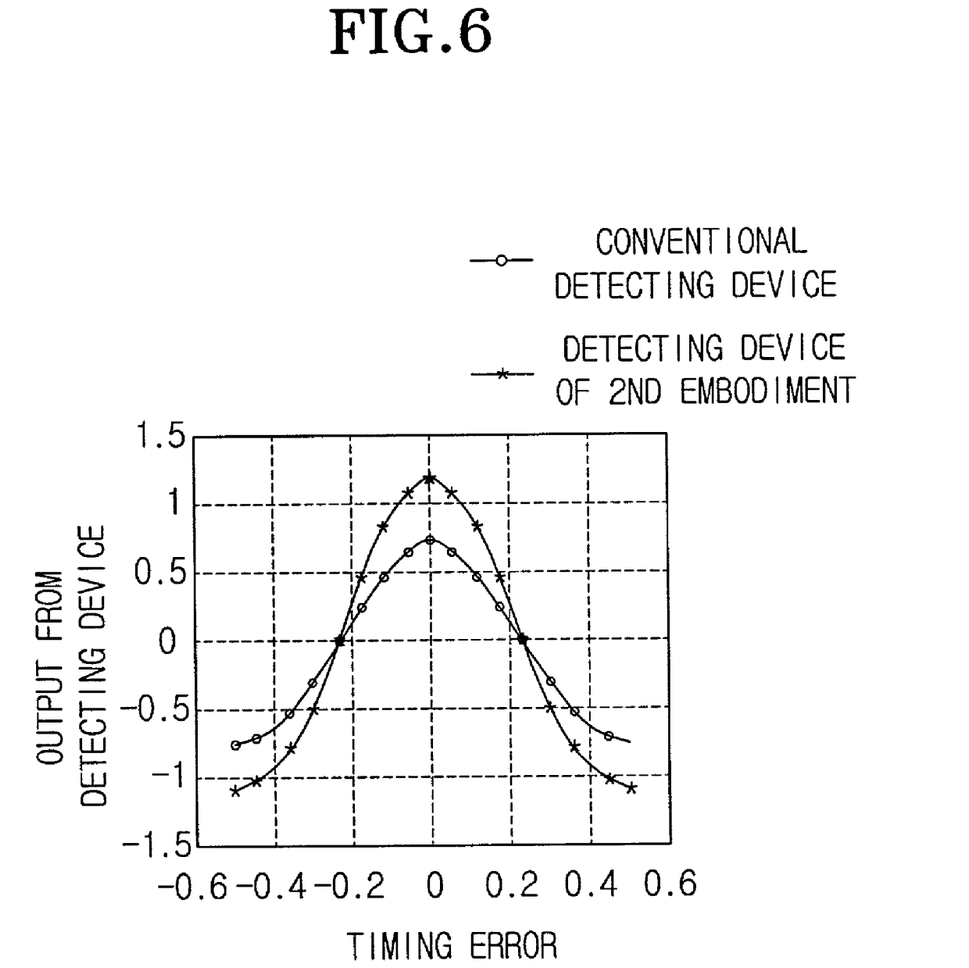
FIG. 6 is a graph showing output properties of the device in FIG. 5 and the device in FIG. 1 according to the timing error.

FIG. 6 is a graph showing output properties of the device in FIG. 5 and the device in FIG. 1 according to the timing error. As shown in FIG. 6, quadrature phase shift keying is used as a modulation method, and a roll-off factor is 0.3.

The device in FIG. 5 has a greater value in an optimal point where the timing error is zero than the conventional device, and has a smaller value in a point where the timing error has the greatest value than the conventional devices. As a result, the device of the present invention has more excellent synchronization detection performance than the conventional device.

Although the preferred embodiments of the present invention have been described, it is understood that the present invention should not be limited to these preferred embodiments but various changes and modifications can be made by one skilled in the art within the spirit and scope of the present invention as hereinafter claimed. In this embodiment, the value obtained by subtracting the power level of the difference between the semi-symbol period preceding sample and the semi-symbol period succeeding sample from the power level of the input signal is outputted as the timing synchronization discriminating signal. However, it is also possible to calculate a power level of a difference between preceding and succeeding samples of a symbol period, instead of the semi-symbol period.

As discussed earlier, in accordance with the present invention, the timing synchronization can be easily detected by using the general device for detecting the timing error.

Moreover, the timing synchronization can be precisely detected by using the new algorithm.

What is claimed is:

1. A device for detecting a timing synchronization in a communication device, comprising:
    first and second differential filters having a differential property transfer function, for respectively receiving and filtering a real number element and an imaginary number element of an input signal;
    a first power detector for detecting a first power level from the real number element and the imaginary number element of the input signal;
    a second power detector for receiving the real number element and the imaginary element filtered by the first and second differential filters and detecting a second power level from the real number element and the imaginary number element; and
    a subtracter for subtracting the second power level detected by the second power detector from the first power level detected by the first power detector, and outputting the resultant value as a timing synchronization discriminating signal.

2. A device for detecting a timing synchronization in a communication device, comprising:
    first and second band-pass filters for respectively filtering a real number element and an imaginary number element of an input signal by predetermined bands;
    first and second differential filters having a differential property transfer function, for respectively receiving and filtering the real number element and the imaginary number element output from the first and second band-pass filters;
    a first power detector for receiving and detecting a first power level from the real number element and the imaginary number element respectively output from the first and second band-pass filters;
    a second power detector for receiving and detecting a second power level from the real number element and the imaginary number element respectively output from the first and second differential filters; and
    a subtracter for subtracting the second power level detected by the second power detector from the first power level detected by the first power detector, and outputting the resultant value as a timing synchronization discriminating signal.

3. A timing synchronization detecting apparatus in a communication device, compnsing:
    a timing error detecting unit for receiving and semi-symbol delaying a real number element and an imaginary number element of the input signal, and generating a real number signal by subtracting a one-symbol delayed real number element from the real number element of the input signal and an imaginary number signal by subtracting the one-symbol delayed imaginary element from the imaginary number element of the input signal;
    a first power detector for receiving and detecting a first power level from a semi-symbol delayed real number element of the input signal and a semi-symbol delayed imaginary element of the input signal output from the timing error detecting unit;
    a second power detector for receiving detecting a second power level from the real number signal and the imaginary number signal generated by the timing error detecting unit; and
    a subtracter for subtracting a value, which is obtained by multiplying the second power level detected by the second power detector by a predetermined coefficient, from the first power level detected by the first power detector to generate a timing synchronization discriminating signal.

4. The device of claim 3, wherein the timing error detecting unit comprises:
    a first semi-symbol delay unit for delaying the real number element of the input signal by a semi-symbol period and outputting the semi-symbol delayed real number element;
    a second semi-symbol delay unit for delaying the imaginary number element of the input signal by a semi-symbol period and outputting the semi-symbol delayed imaginary element;
    a third semi-symbol delay unit for receiving and delaying by a semi-symbol period the semi-symbol delayed real number element of the input signal output from the first semi-symbol delay unit and outputting the one-symbol delayed real number element;
    a fourth semi-symbol delay unit for delaying by a semi-symbol period the semi-symbol delayed imaginary number element of the input signal output from the second semi-symbol delay unit and outputting the one-symbol delayed imaginary number element;
    a first subtracter for generating the real number signal subtracting the one-symbol delayed real number element output by the third semi-symbol delay unit from the real number element of the input signal; and
    a second subtracter for generating the imaginary number signal by subtracting the one-symbol delayed imaginary number element output by the fourth semi-symbol delay unit from the imaginary number element of the input signal.

5. The device of claim 4, wherein the coefficient is 0.5.

6. A method for detecting a timing synchronization in a communication device, comprising:
    detecting a first power level by semi-symbol delaying a real number element and an imaginary number element of an input signal;
    detecting a second power level by one-symbol delaying the real number element and the imaginary number element of the input signal, and then subtracting the delayed real number element from the real number element of the input signal and the delayed imaginary number element from the imaginary number element of the input signal;
    multiplying the second power level by a predetermined coefficient; and
    subtracting the second power level multiplied by the predetermined coefficient from the first power level.

7. The method of claim 6, wherein the coefficient is 0.5.

8. A communication device, comprising:

a timing synchronization detecting unit for generating a timing synchronization discriminating signal corresponding to a power difference between preceding and succeeding samples of an input signal that are respectively ahead of and behind the input signal by a semi-symbol period, respectively;

a detection timing deciding unit for deciding detection timing of the input signal according to the timing synchronization discriminating signal from the timing synchronization detecting unit; and a data detecting unit for detecting the input signal according to the timing decided by the detection timing deciding unit.

9. The device of claim 8, wherein the detection timing is when the timing synchronization discriminating signal reaches a maximum value or an inflection point.

10. A method for detecting a timing synchronization in a communication device, comprising:

differential filtering a real number element and an imaginary number element of an input signal;

detecting a first power level from the real number element and the imaginary number element of the input signal;

detecting a second power level from the differential filtered real number element of the input signal and the differential filtered imaginary number element of the input signal; and subtracting the second power level from the first power level.

* * * * *